US012511142B2

(12) United States Patent
Griffin et al.

(10) Patent No.: US 12,511,142 B2
(45) Date of Patent: Dec. 30, 2025

(54) CONTAINER RUNTIME ENGINE, AND METHOD AND SYSTEM OF THE SAME

(71) Applicant: Red Hat, Inc., Raleigh, NC (US)

(72) Inventors: Leigh Griffin, Waterford (IE); Pierre-Yves Chibon, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 475 days.

(21) Appl. No.: 18/087,205

(22) Filed: Dec. 22, 2022

(65) Prior Publication Data
US 2024/0211287 A1 Jun. 27, 2024

(51) Int. Cl.
*G06F 9/455* (2018.01)
*G06F 9/445* (2018.01)
*G06F 9/50* (2006.01)

(52) U.S. Cl.
CPC ........ *G06F 9/4552* (2013.01); *G06F 9/44505* (2013.01); *G06F 9/5077* (2013.01)

(58) Field of Classification Search
CPC .................................................... G06F 9/4552
See application file for complete search history.

(56) References Cited

U.S. PATENT DOCUMENTS

| | | | |
|---|---|---|---|
| 10,606,480 B2 | 3/2020 | Engel et al. | |
| 10,719,345 B2 | 7/2020 | Du et al. | |
| 10,719,369 B1* | 7/2020 | Aithal | G06F 9/45558 |
| 10,812,582 B2 | 10/2020 | Spillane et al. | |
| 10,892,960 B1* | 1/2021 | Emelyanov | H04L 41/0803 |
| 10,901,700 B2 | 1/2021 | Wang et al. | |
| 11,263,005 B2 | 3/2022 | Kunjuramanpillai et al. | |
| 2021/0399954 A1 | 12/2021 | Dabell et al. | |
| 2022/0317987 A1* | 10/2022 | Scrivano | G06F 16/196 |
| 2022/0398070 A1* | 12/2022 | Orozco Cervantes | G06F 8/60 |
| 2024/0103823 A1* | 3/2024 | Douglas | G06F 8/36 |
| 2024/0338238 A1* | 10/2024 | Wang | G06F 9/45545 |

FOREIGN PATENT DOCUMENTS

| | | |
|---|---|---|
| CN | 114489694 A | 5/2022 |
| DE | 112020000558 T5 | 12/2021 |

* cited by examiner

*Primary Examiner* — Charlie Sun
(74) *Attorney, Agent, or Firm* — Kilpatrick Townsend & Stockton LLP

(57) ABSTRACT

Method and system for improving a container runtime engine to allow rebuilding containers for different processor architectures are provided. The method may include exporting an export file and contextual information based on a container by a first container runtime engine in a first processor architecture. The method may further include rebuilding the container based on the export file and the contextual information by a second container runtime engine, wherein the rebuilt container is configured to be run by the second container runtime engine in a second processor architecture. The system may include at least one processor and a non-transitory computer-readable memory storing instructions that cause the method to be performed.

20 Claims, 3 Drawing Sheets

CONTAINER RUNTIME ENGINE, AND METHOD AND SYSTEM OF THE SAME

BACKGROUND

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, container-based virtualization systems may be employed. A container is a set of one or more processes that are isolated from the rest of the system. The container is portable and may be consistent as it moves from development, to testing, and finally to production. This generally makes containers much quicker to use than development pipelines that rely on replicating traditional testing environments. A container runtime engine is able to export a container into an archive for later use.

SUMMARY

The present disclosure provides novel and innovative systems and methods for a container runtime engine. In particular, the present disclosure is directed to an improved container runtime engine that allows rebuilding containers for different processor architectures.

In light of the present disclosure, and without limiting the scope of the disclosure in any way, in an aspect of the present disclosure, which may be combined with any other aspect listed herein unless specified otherwise, a method is provided. The method may include exporting an export file and contextual information based on a container by a first container runtime engine in a first processor architecture. The method may further include rebuilding the container based on the export file and the contextual information by a second container runtime engine, wherein the rebuilt container is configured to be run by the second container runtime engine in a second processor architecture.

In some examples, a system for improving a container runtime engine to allow rebuilding containers for different processor architectures may include at least one processor and non-transitory computer-readable memory. The non-transitory computer-readable memory may store instructions that, when executed by the at least one processor, are effective to export an export file and contextual information based on a container by a first container runtime engine in a first processor architecture. The non-transitory computer-readable memory may store further instructions that, when executed by the at least one processor, are effective to rebuild the container based on the export file and the contextual information by a second container runtime engine, wherein the rebuilt container is configured to be run by the second container runtime engine in a second processor architecture.

In some examples, a non-transitory machine-readable medium may store a program which, when executed by a processor, may be effective to perform a method that includes exporting an export file and contextual information based on a container by a first container runtime engine in a first processor architecture. The method may further include rebuilding the container based on the export file and the contextual information by a second container runtime engine in a second processor architecture, wherein the rebuilt container is configured to be run by the second container runtime engine in the second processor architecture.

Additional features and advantages of the disclosed methods and systems are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

Features and advantages of methods and systems for container runtime engine described herein may be better understood by reference to the accompanying drawings in which.

DETAILED DESCRIPTION

Figure 1:
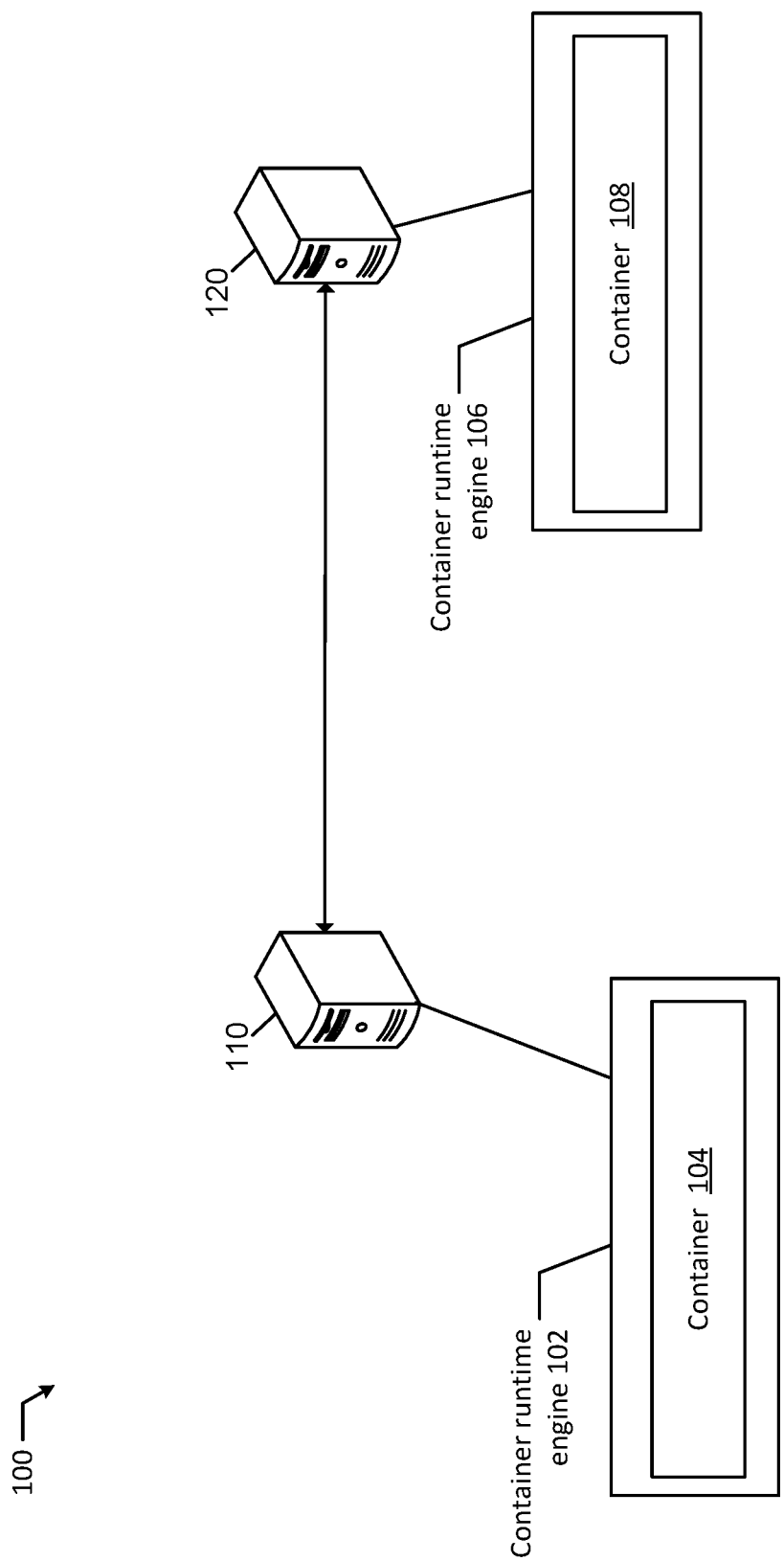
FIG. 1 is a block diagram of a system of container runtime engines according to an embodiment of the present disclosure.

The present disclosure generally relates to methods and systems for container runtime engines that allow rebuilding containers for different processor architectures.

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, container-based virtualization systems may be employed. For example, a "cluster" of such resources that is managed by a container manager (sometimes referred to as a "container orchestration service") such as Red Hat OpenShift executing a container runtime engine and/or containerization runtime environment such as Podman, Docker, Linux LXC, CRI-O, RKT, Containerd, Hyper-V, Windows Containers and the like (referred to herein as container runtime engine) may be advantageous, as container based virtualization systems may be lighter weight than systems using virtual machines with hypervisors.

In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat OpenShift, Kubernetes, Docker Swarm), generally respond to frequent container startups and cleanups with low latency. Containers may enable wide spread, parallel deployment of computing power for specific tasks. In a typical example, a container may be instantiated to process a specific task and may be reaped (e.g., un-instantiated) after the task is complete.

Container images are immutable files that include the source code, libraries, dependencies, tools, and/or other files used by an application or service to run. Due to the read-only quality of container images, container images represent an application or service at a specific point in time (e.g., for a particular version) allowing developers to test and experiment on software in stable, uniform conditions.

A container runtime engine is able to export a container into an archive, but the archive is architecture specific. For example, a container confirmed to be working in one processor architecture may not be running properly in a different processor architecture. To ensure the repeatability and compatibility of a container across different processor architectures, there still exists a need to develop effective and efficient container runtime engines that are able to rebuild a container that is same as the original container and can be properly run for a different processor architecture.

Container runtime engines such as Podman or Docker can generate or export an export file from a container image. The export file includes a binary blob. For example, the export file may include a containerfile, a dockerfile, a YAML file or a JSON file. A container runtime engine is able to export a container into an archive which is a storage deployment target and is represented by a binary blob. However, the archive is still architecture specific. For example, when a container is run in an x86 (e.g., 64 bit) processor architecture, the archive exported from the container is specific to the x86 (e.g., 64 bit) processor architecture. If the archive is used to rebuild the container on a different processor architecture such as an ARM (e.g., 64 bit) processor, then it's not guaranteed that the rebuilt container on the ARM processor architecture is exact same as the original container on the x86 processor architecture. Especially when moving between various architectures, it can't be guaranteed that the exact execution sequence, path and/or intended outputs are going to be the same. Thus, it presents a challenge when it comes to repeatability and/or compatibility of a container across different processor architectures.

In order to address the technical problems described above, the present disclosure provides a system capable of improving container runtime engines to allow rebuilding containers for different processor architectures. Specifically, the disclosed system is able to export an export file and contextual information based on a container by a container runtime engine. The container runtime engine is able to take the architecture specific tweaks in an abstract form on the export file based on the contextual information, and makes it an architecture neutral approach, and thus the rebuilt container can be applied and/or run in different processor architectures without issues.

The embodiments are described more fully herein after with reference to the accompanying drawings, in which some, but not all embodiments of the present technology are shown. Indeed, the present technology may be embodied in many different forms and should not be construed as limited to the embodiments set forth herein.

Likewise, many modifications and other embodiments of the methods and systems for container runtime engines described herein will come to mind to one of skill in the art to which the invention pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning. Likewise, the phrase "in an embodiment" as used herein does not necessarily refer to the same embodiment or implementation and the phrase "in another embodiment" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context. In addition, the terms "about," "around" "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

The terminology used herein is for the purpose of describing particular exemplary embodiments only and is not intended to be limiting. The terms "comprise", "comprises", "comprised" or "comprising", "including" or "having" and the like in the present specification and claims are used in an inclusive sense, that is to specify the presence of the stated features but not preclude the presence of additional or further features. As used herein, the term "and/or" includes any and all combinations of one or more of the associated listed items.

FIG. 1 illustrates a system 100 of container runtime engines according to an embodiment of the present disclosure. The system 100 may include one or more computing device(s) 110 and computing device(s) 120. Any of the computing device 110 and the computing device 120 may comprise include a network device (e.g., a network adapter or any other component that connects a computer to a computer network), input/output (I/O) devices, storage device, memory device, at least one processor, and the like.

As used herein, a processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data.

In various examples, the computing device 110 may execute a container runtime engine 102 to run a container 104. The container runtime engine 102 may include at least one of Podman, Docker, Linux LXC, CRI-O, RKT, Containerd, Hyper-V, Windows Containers and the like. The container runtime engine 102 is installed on the computing device 102 having a first processor architecture. The first processor architecture may be selected from x86, x64, s390x, PowerPC or ARM processors. The x86 processor has a 32-bit architecture, and the x64 processor has a 64-bit architecture. The container runtime engine 102 is configured to export an export file and contextual information based on the container 104 by the container runtime engine 102 in the first processor architecture. The contextual information is associated with a container image of the container 104. The exported contextual information provides more contextual information about the container image. For example, the contextual information may include a list of packages or metadata or both. The list of packages may include a number of RPM packages that contain at least one of binary executables or configuration files. The metadata may include information related to configuration of the first processor architecture. For example, the metadata may include architecture specific information indicating what the processor architecture the container is running on. As a non-limiting example, if the container 104 is running on an x84 processor architecture, the metadata may include the architecture specific information indicating the processor architecture is an x84 processor architecture.

When the container runtime engine 102 export an export file and contextual information from a container image of the container 104, the contextual information may be embedded or integrated with the export file as a single file in one embodiment. In another embodiment, the contextual information associated with the container image of the container 104 may be provided in a different file separate from the export file. The export file includes binary blob. For example, the export file may include at least one of a containerfile, dockerfile, YAML file, JSON file or the like.

The computing device 120 may have a similar hardware configuration with respect to the computing device 110 in an embodiment. However, the computing device 120 may be a remote device with a different configuration with respect to the computing device 110 in another embodiment. The computing device 120 may be communicatively coupled to the computing device 110 over a network (e.g., a local area network (LAN) or a wide area network (WAN) such as the Internet) in an embodiment. The computing device 120 may also be directly connected with the computing device 110 via a wire or cable in another embodiment. The computing device 120 may execute a container runtime engine 106 to run a container 108. The container runtime engine 106 may include at least one of Podman, Docker, Linux LXC, CRI-O, RKT, Containerd, Hyper-V, Windows Containers and the like. The container runtime engine 106 is installed on the computing device 120 having a second processor architecture that is different from the first processor architecture in the computing device 110. The second processor architecture may be selected from x86, x64, s390x, PowerPC, ARM processors or the like. The second processor architecture as used in the computing device 120 is different from the first processor architecture as used in the computing device 110.

The container runtime engine 106 in the second processor architecture is configured to rebuild the container 104 based on the export file and the contextual information exported from the container runtime engine 102. More specifically, the container runtime engine 106 is able to take the architecture specific tweaks in an abstract form on the export file based on the contextual information. For example, the container runtime engine 106 is able to decorate the export file generated from container 104 by editing or removing certain logic code(s) and/or architecture specific metadata to create a decorated export file that is tailored to the second processor architecture. Thus, the rebuilt container (e.g., container 108) based on the decorated export file can be properly run by the container runtime engine 106 in a second processor architecture without issues. It's guaranteed that the exact execution sequence, path and/or intended outputs are going to be the same as the container 104 running in the first processor architecture.

In another embodiment, the rebuild process of container 104 can happen in container runtime engine 102. For example, the container runtime engine 102 can rebuild the container 104 for a different processor architecture based on the export file and the contextual information associated with a container image of the container 104. The container runtime engine 102 can decorate the export file by editing or removing certain logic code(s) and/or architecture specific metadata to create a decorated export file that is tailored to the second processor architecture. The container runtime engine 102 can generate the rebuilt container based on the decorated export file for the second processor architecture, and then send the rebuilt container to the computing device 120. Thus, the rebuilt container can be properly run by the container runtime engine 106 in the second processor architecture without issues.

As a non-limiting example, the computing device 110 is based on an x86 processor architecture and the computing device 120 is based on an ARM processor architecture. When a container that is created in one processor architecture (e.g., x86 processor architecture) is executed on a different processor architecture (e.g., ARM processor architecture), the container may not be able to be properly run on the different processor architecture due to potential mismatch and/or potential wrong time error from a dependency perspective. To solve this issue, the container runtime engine 102 is configured to export an export file and contextual information based on the container 104 that is properly run by the container runtime engine 102 in the x86 processor architecture. The computing device 110 then sends the export file with contextual information of the container 104 to the computing device 120. The container runtime engine 106 is able to rebuild the container 104 for the ARM processor architecture based on the export file with contextual information of the container 104. For example, the container runtime engine 106 is able to take the architecture specific tweaks in an abstract form on the export file based on the contextual information. More specifically, the container runtime engine 106 may decorate the export file by editing or removing certain logic code(s) and/or architecture specific metadata to create a decorated export file that is tailored to the second processor architecture. For instance, the container runtime engine 106 may decorate the export file by replacing the x86 processor architecture specific code(s) and/or metadata with the ARM processor architecture specific code(s) and/or metadata. Thus, the rebuilt container based on the decorated export file is tweaked for ARM processor architecture, and the rebuilt container can be properly run by the container runtime engine 106 in the ARM processor architecture without issues. By implementing the process, it's guaranteed that the exact execution sequence, path and/or intended outputs of the rebuilt container are going to be the same as the original container 104 running in the x86 processor architecture.

Figure 2:
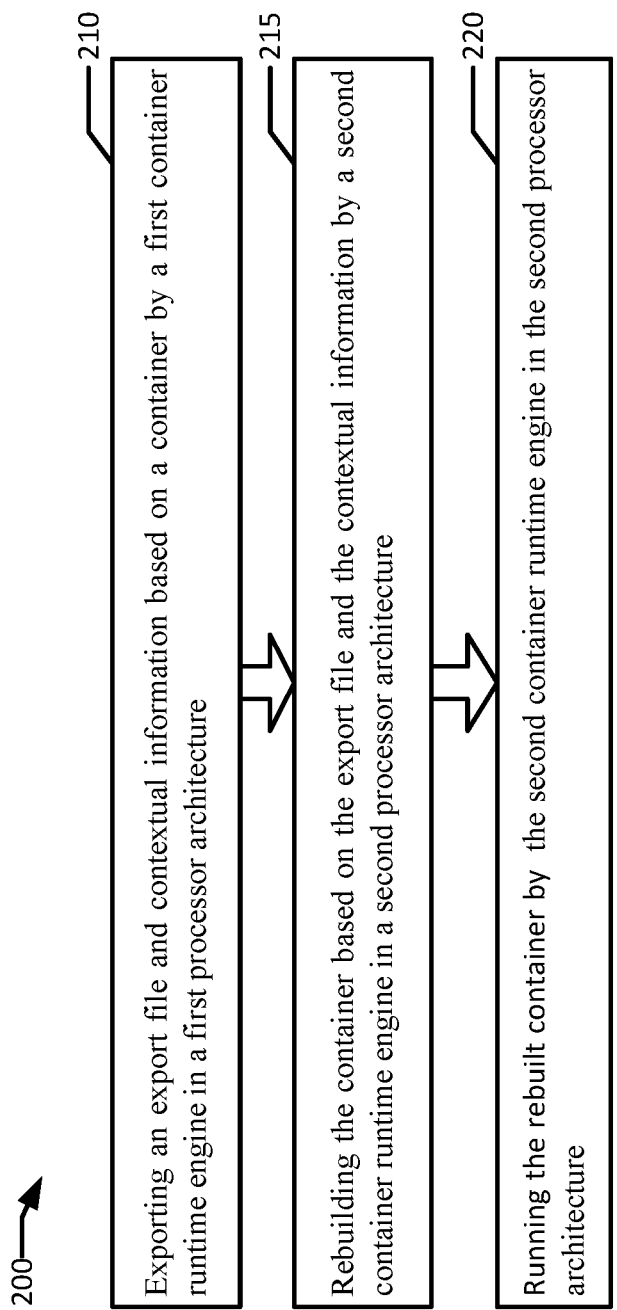
FIG. 2 is a flowchart illustrating a method for container runtime engines according to an embodiment of the present disclosure.

FIG. 2 illustrates a method of rebuilding containers for different processor architectures. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The method 200 may include exporting an export file and contextual information based on a container by a first container runtime engine in a first processor architecture (block 210). The first container runtime engine may be chosen from Podman, Docker, Linux LXC, CRI-O, RKT, Containerd, Hyper-V, Windows Containers and the like. The first processor architecture may be one of x86, x64, s390x, PowerPC or ARM processors. The x86 processor here has a 32-bit architecture, and the x64 processor here has a 64-bit architecture. The container can be properly run by the first container runtime engine in the first processor architecture. The first container runtime engine is configured to export an export file and contextual information based on the container. The export file may include binary blob in an embodiment. For example, the export file may include at least one of a containerfile, dockerfile, YAML file, JSON file or the like. The export file may also include a plurality of layers, and the contextual information may be provided in one or more layers of the export file according to one embodiment. The contextual information may be provided in a different file that is separate from the export file in another embodiment. The contextual information is associated with a container image of the container. The exported contextual information provides more contextual information about the container image. For example, the contextual information may include a list of packages or metadata or both. The list of packages may include a number of RPM packages that contain at least one of binary executables or configuration files. The metadata may include information related to configuration of the first processor architecture. For example, the metadata may include architecture specific information indicating what the processor architecture the container is running on.

The method may further include rebuilding the container based on the export file and the contextual information by a second container runtime engine in a second processor architecture (block 215). The second container runtime engine may be selected from Podman, Docker, Linux LXC, CRI-O, RKT, Containerd, Hyper-V, Windows Containers and the like. The second container runtime engine may be the same as the first container runtime engine in an embodiment. However, the second container runtime engine may also be different from the second container runtime engine in another embodiment. The second processor architecture may be one of x86, x64, s390x, PowerPC or ARM processors. The x86 processor here has a 32-bit architecture, and the x64 processor here has a 64-bit architecture. The second processor architecture is different from the first processor architecture. For example, if the second processor architecture is an ARM processor, then the first processor architecture may be a different processor rather than the ARM processor. The second container engine in the second processor architecture is configured to rebuild the container based on the export file and the contextual information exported from the first container runtime engine. The second container runtime engine is able to take the architecture specific tweaks in an abstract form on the export file based on the contextual information. For example, the second container runtime engine is able to decorate the export file by editing or removing certain logic code(s) and/or architecture specific metadata in certain layer or layers of the export file to create a decorated export file that is tailored to the second processor architecture according to an embodiment. The second container runtime engine in the second processor architecture may then run the rebuilt container (block 220). Therefore, the rebuilt container based on the decorated export file can be properly run by the second container runtime engine in the second processor architecture without issues. It's thus guaranteed that the exact execution sequence, path and/or intended outputs of the rebuilt container are going to be the same as the original container running in the first processor architecture.

In another embodiment, the rebuild process of container can happen in the first container runtime engine. For example, the first container runtime engine can rebuild the container 104 for a different processor architecture based on the export file and the contextual information associated with a container image of the container. The first container runtime engine can decorate the export file by editing or removing certain logic code(s) and/or architecture specific metadata to create a decorated export file that is tailored to the second processor architecture that is different from the first processor architecture. The first container runtime engine can send the decorated export file to the second container runtime engine, and the second container runtime engine can regenerate the rebuilt container based on the decorated export file. Thus, the rebuilt container can be properly run by the second container runtime engine in the second processor architecture without issues.

Figure 3:
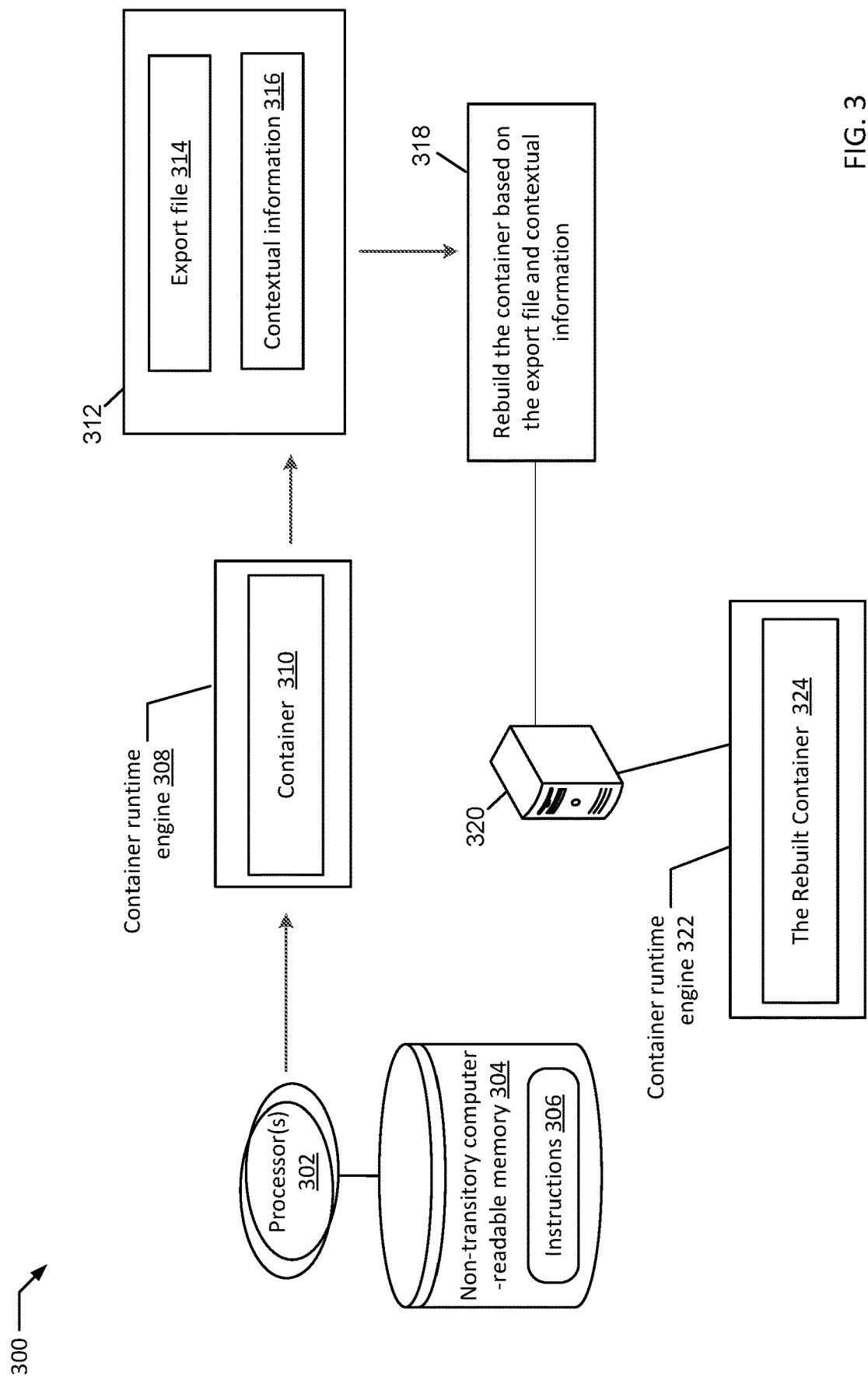
FIG. 3 is a block diagram of a system having a non-transitory machine-readable medium effective to implement a method for improving one or more container runtime engines to allow rebuilding containers for different processor architectures according to an embodiment of the present disclosure.

FIG. 3 is a block diagram 300 that includes one or more processors 302 configured in communication with a non-transitory computer-readable memory 304. The non-transitory computer-readable memory 304 may store instructions 306 that cause one or more of the actions and/or methods described herein to be performed. In various examples, the method may include exporting a file 312 including an export file 314 and contextual information 316 based on a container 310 by a container runtime engine 308 in a first processor architecture. It should be understood that the export file 314 and contextual information 316 may be combined and/or integrated together as a standalone file in an embodiment. However, the export file 314 and contextual information 316 may also be separate from each other in another embodiment.

The container runtime engine 308 may be chosen from Podman, Docker, Linux LXC, CRI-O, RKT, Containerd, Hyper-V, Windows Containers and the like. The first processor architecture may be one of x86, x64, s390x, PowerPC or ARM processors. The x86 processor here has a 32-bit architecture, and the x64 processor here has a 64-bit architecture. The container 310 can be properly run by the container runtime engine 308 in the first processor architecture. The container runtime engine 308 is configured to export an export file and contextual information based on the container 310. The export file may include binary blob in an embodiment. For example, the export file may include at least one of a containerfile, dockerfile, YAML file, JSON file or the like. The export file may also include a plurality of layers, and the contextual information may be provided in one or more layers of the export file according to one embodiment.

The contextual information is associated with a container image of the container 310. The contextual information provides more contextual information about the container image. For example, the contextual information may include a list of packages or metadata or both. The list of packages may include a number of RPM packages that contain at least one of binary executables or configuration files. The metadata may include information related to configuration of the first processor architecture. For example, the metadata may include architecture specific information indicating what the processor architecture the container 310 is running on.

The method may further include rebuilding the container based on the export file and the contextual information as illustrated as block 318 in FIG. 3. The rebuilding process 318 can be performed by the container runtime engine 322 residing in a computing device 320 in an embodiment. However, it is not limited to such scenario. In another embodiment, the rebuilding process 318 can be performed by the container runtime engine 308.

In case that the rebuilding process 318 is performed by the container runtime engine 322 in a second processor architecture. The container runtime engine 322 may be selected from Podman, Docker, Linux LXC, CRI-O, RKT, Containerd, Hyper-V, Windows Containers and the like. The container runtime engine 322 may be the same as the container runtime engine 308 in an embodiment. However, the container runtime engine 322 may also be different from the container runtime engine 308 in another embodiment. The second processor architecture may be one of x86, x64, s390x, PowerPC or ARM processors. The x86 processor here has a 32-bit architecture, and the x64 processor here has a 64-bit architecture. The second processor architecture is different from the first processor architecture. For example, if the second processor architecture is an ARM processor, the first processor architecture may be a different processor rather than the ARM processor. If the second processor architecture is an x86 (i.e., 32-bit) processor, the first processor architecture may be a different processor such as x64 (i.e., 64-bit) processor rather than the x86 (i.e., 32-bit) processor.

The container engine 322 in the second processor architecture is configured to rebuild the container based on the export file and the contextual information exported from the container runtime engine 308. The container runtime engine 322 is able to take the architecture specific tweaks in an abstract form on the export file based on the contextual information. For example, the second container runtime engine is able to decorate the export file by editing or removing certain logic code(s) and/or architecture specific metadata in certain layer or layers of the export file to create a decorated export file that is tailored to the second processor architecture according to an embodiment. Therefore, the rebuilt container 324 based on the decorated export file can be properly run by the container runtime engine 322 in the second processor architecture without issues. Then, it's guaranteed that the exact execution sequence, path and/or intended outputs of the rebuilt container 324 are going to be the same as the original container 310 running in the first processor architecture.

In case that the rebuilding process 318 is performed by the container runtime engine 308 in the first processor architecture. The container runtime engine 308 can rebuild the container 310 tailored for a different processor architecture (e.g., the second processor architecture) based on the export file and the contextual information associated with a container image of the container 310. The container runtime engine 308 can decorate the export file by editing or removing certain logic code(s) and/or architecture specific metadata to create a decorated export file that is tailored to the second processor architecture. The container runtime engine 308 can send the decorated export file to the container runtime engine 322 residing in the computing device 320, and the container runtime engine 322 can regenerate the rebuilt container 324 based on the decorated export file. Thus, the rebuilt container 324 can be properly run by the container runtime engine 322 in the second processor architecture without issues.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits (ASICs), field programmable gate arrays (FPGAs), digital signal processor (DSPs) or any other similar devices. The instructions may be executed by one or more processors, which when executing the series of computer instructions, performs or facilitates the performance of all or part of the disclosed methods and procedures.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention is claimed as follows:

1. A method comprising:
deploying, by a first container runtime engine on a first processor architecture, a container from a container image;
exporting, by the first container runtime engine, an export file and contextual information from the deployed container, wherein the export file includes at least one feature specific to the first processor architecture, and wherein the export file is different from the container image; and
rebuilding the container based on the export file and the contextual information by a second container runtime engine, wherein the rebuilt container is configured to be run by the second container runtime engine on a second processor architecture that is different from the first processor architecture, and wherein rebuilding the container based on the export file involves modifying the export file to remove the at least one feature specific to the first processor architecture such that the modified export file is suitable for the second processor architecture.

2. The method of claim 1, wherein:
the first and second processor architectures include at least one of x86, s390x, PowerPC or ARM processors.

3. The method of claim 1, wherein the contextual information is obtained from the container image of the container.

4. The method of claim 1, wherein the contextual information includes at least one of packages or metadata.

5. The method of claim 4, wherein the packages include RPM packages that contain at least one of binary executables or configuration files.

6. The method of claim 4, wherein the metadata includes information related to a configuration of the first processor architecture.

7. The method of claim 1, wherein the export file includes binary blob.

8. The method of claim 1, wherein the contextual information is separated from the export file.

9. The method of claim 1, wherein the at least one feature specific to the first processor architecture includes a logic code.

10. The method of claim 1, wherein the at least one feature specific to the first processor architecture includes architecture specific metadata.

11. The method of claim 1, wherein the modified export file is tailored to the second processor architecture.

12. A system comprising:
at least one processor; and
at least one non-transitory computer-readable memory storing instructions that, when executed by the at least one processor, are effective to:
deploying, by a first container runtime engine on a first processor architecture, a container from a container image;
export, by the first container runtime engine, an export file and contextual information from the deployed container, wherein the export file includes at least one feature specific to the first processor architecture, and wherein the export file is different from the container image; and
rebuild the container based on the export file and the contextual information, wherein the rebuilt container is configured to be run by a second container runtime engine on a second processor architecture that is different from the first processor architecture, and wherein rebuilding the container based on the export file involves modifying the export file to remove the at least one feature specific to the first processor architecture such that the modified export file is suitable for the second processor architecture.

13. The system of claim 12, wherein the first and second processor architectures include at least one of x86, s390x, PowerPC or ARM processors.

14. The system of claim 12, wherein the contextual information is obtained from the container image of the container.

15. The system of claim 12, wherein the contextual information includes at least one of packages or metadata.

16. The system of claim 15, wherein the packages include RPM packages that contain at least one of binary executables or configuration files.

17. The system of claim 15, wherein the metadata includes information related to configuration of the first processor architecture.

18. The system of claim 12, wherein the export file includes binary blob.

19. The system of claim 12, wherein the contextual information is separated from the export file.

20. A non-transitory computer-readable memory storing instructions that, when executed by at least one processor, are effective to perform a method comprising:
deploying, by a first container runtime engine on a first processor architecture, a container from a container image;
exporting, by the first container runtime engine, an export file and contextual information from the deployed container, wherein the export file includes at least one feature specific to the first processor architecture, and wherein the export file is different from the container image; and
rebuilding the container based on the export file and the contextual information, wherein the rebuilt container is configured to be run by a second container runtime engine on a second processor architecture that is different from the first processor architecture, and wherein rebuilding the container based on the export file involves modifying the export file to remove the at least one feature specific to the first processor architecture such that the modified export file is suitable for the second processor architecture.

* * * * *